(12) United States Patent
Ruga et al.

(10) Patent No.: US 7,770,808 B2
(45) Date of Patent: Aug. 10, 2010

(54) THERMOSTATIC MIXING VALVE

(76) Inventors: Manolo Ruga, Via Regina Villa 38, 28024 Gozzano NO (IT); Osvaldo Ruga, Via Regina Villa 38, 28024 Gozzano NO (IT)

( * ) Notice: Subject to any disclaimer, the term of this patent is extended or adjusted under 35 U.S.C. 154(b) by 888 days.

(21) Appl. No.: 10/596,099

(22) PCT Filed: Dec. 5, 2003

(86) PCT No.: PCT/IT03/00803

§ 371 (c)(1),
(2), (4) Date: Nov. 14, 2006

(87) PCT Pub. No.: WO2005/054971

PCT Pub. Date: Jun. 16, 2005

(65) Prior Publication Data

US 2007/0152075 A1    Jul. 5, 2007

(51) Int. Cl.
*G05D 23/13* (2006.01)
(52) U.S. Cl. ............... 236/12.2; 236/12.1; 236/100; 137/625.41
(58) Field of Classification Search ..... 236/12.1–12.23; 137/625, 625.4
See application file for complete search history.

(56) References Cited

U.S. PATENT DOCUMENTS 5,340,018 A    8/1994   MacDonald
5,433,378 A *  7/1995   Orlandi ............... 236/12.2
6,089,462 A *  7/2000   Osvaldo .............. 236/12.2
6,517,006 B1 * 2/2003   Knapp ................ 236/12.2
6,557,770 B2   5/2003   Chamot

FOREIGN PATENT DOCUMENTS

| EP | 0560737     |   | 9/1993 |
|----|-------------|---|--------|
| EP | 0611260     |   | 8/1994 |
| EP | 0611260 A1  | * | 8/1994 |
| EP | 1235129 A1  | * | 8/2002 |

* cited by examiner

*Primary Examiner*—Cheryl J Tyler
*Assistant Examiner*—Paolo Gonzalez
(74) *Attorney, Agent, or Firm*—Lucas & Mercanti, LLP

(57) ABSTRACT

The invention relates to a thermostatic mixing valve in which the access path of the hot water to the mixing chamber is completely formed within a bottom base (2) and the ceramic disks (4, 5) of the valve group, the slider (8) of the thermostatic member sealingly sliding in a central seat of the upper disk (5). By having the hot water not pass through the metallic members of the valve it is possible to eliminate the problems of asymmetric thermal expansion of said metallic members when only hot water is delivered, and also to greatly reduce the problems of calcareous encrustations since the latter build up with difficulty on the ceramic material. Furthermore, the valve is manufactured with a compact and simplified structure, including a small number of pieces, with totally independent temperature and flow rate controls.

7 Claims, 3 Drawing Sheets

THERMOSTATIC MIXING VALVE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

BACKGROUND OF THE INVENTION (1) Field of the Invention

The present invention relates to taps for mixing hot and cold water in sanitary facilities (wash-basins, showers, bathtubs, etc.), and in particular to a cartridge mixing valve provided with a thermostatic device suitable to maintain a constant water temperature.

(2) Description of Related Art

It is known that conventional single-control mixing taps include, a tap body with a cartridge mixing valve (hereinafter simply valve) removably inserted therein and a control lever for controlling a valve group, within the cartridge, made up of a pair of ceramic disks which adjust the flow of hot and cold water. This adjustment of the water, both in flow rate and in temperature, is carried out through the translation and rotation, respectively, of a mobile disk over an underlying fixed disk. In this way, the extent of aperture of the ports formed in said disks for the passage of hot and cold water is changed, and so is the ratio between hot water and cold water when they are mixed prior to the conveying to the tap mouth.

In order to maintain a constant temperature of the delivered water, both between two tap openings and during a same opening, it is possible to incorporate a thermostatic device in a conventional tap. Such a device acts downstream from the valve group by controlling the inflow of hot and cold water into the mixing chamber through respective ports.

As it will be better explained further on, this control is carried out automatically by a thermosensitive bulb which causes the shifting of a slider suitable to change the aperture of said ports in the mixing chamber. However, although known from some time, conventional thermostatic mixing valves still have some drawbacks of various nature.

A first drawback is the asymmetric thermal expansion that occurs when only hot water is delivered. In fact the metallic members of the thermostatic device are passed through by hot water coming from one side only, whereby they expand more on one side and tend to warp. As a result they may not work properly, for example the slider may get stuck and thus affect the operation of the device.

A second kind of drawback comes from the calcareous encrustations, especially on the hot water side, which may jeopardize the correct operation of the device. This problem stems from the fact that the slider travel is of a few tenths of a millimeter (usually max. 0.6 mm), therefore even small-size impurities may prove detrimental.

Still another kind of drawback is the use of a single control for temperature and flow rate, that implies a difficult repeatability of temperature between two openings. Moreover, there is a poor precision in adjusting the temperature due to the limited travel of the single control, which generally has a maximum rotatory travel of 90° around the tap mouth (±45°).

A known solution allowing to separate the flow rate control from the temperature control is to place the thermostatic device above the valve group. The use of two separate controls allows to achieve a more precise adjustment of temperature through the rotation of a ring along a greater arc (up to 360°), and also without any problem of repeatability between two openings.

However, even this solution is not free from drawbacks in that the flow rate control is a horizontal rotating lever located above the ring for the temperature adjustment. This still implies a position of the flow rate control higher than in conventional taps, which results in a tap having a greater overall height. Moreover, the above-described arrangement makes it difficult to reach the ring for the temperature adjustment, since the user has to insert his hand between the tap mouth and the lever above.

Secondly, the thermostatic device is located between the flow rate control and the valve group controlled by the latter. As a result, the flow rate adjustment is necessarily transmitted by a connection which passes through the thermostatic device, which is possibly used directly as a transmission means. In any case, the more or less close coupling between the flow rate control and the temperature control leads to a mutual interference which may affect the device operation. In other words, when changing the flow rate it may happen that also the temperature is changed and vice versa. Moreover, the thermostatic device is stressed also by loads not depending on its specific operation.

Therefore the object of the present invention is to provide a thermostatic mixing valve suitable to overcome the above-mentioned drawbacks.

This object is achieved by means of a valve in which the access path of the hot water to the mixing chamber is completely formed within a bottom base and the two ceramic disks of the valve group.

BRIEF SUMMARY OF THE INVENTION

A first advantage of the present Valve is that of eliminating the problems of asymmetric thermal expansion of the metallic members since the latter are not passed through by hot water but only by cold water.

A second advantage of the valve according to the present invention is that of greatly reducing the problems of calcareous encrustations, since the latter build up with difficulty on the ceramic material of the disks through which the hot water flows.

A third advantage of said valve is the smaller height achieved by having the slider move within the ceramic disks rather than over them.

A further advantage of this cartridge is that it is manufactured with a simplified structure made up of less pieces, which results in lower production and assembly costs.

Other advantages of this valve, in its preferred embodiment, are those of making the flow rate and temperature controls completely independent, whereby no mutual interference is possible, and allowing the arrangement of the coupling of the temperature control at the top, which results in greater ease of adjustment of the temperature and lower overall height of the tap.

Still another advantage of the present invention is a greater ease of adjustment of the flow rate, since the relevant control acts directly on the mobile disk without having to drag other members and therefore with a lower friction.

BRIEF DESCRIPTION OF SEVERAL VIEWS OF THE DRAWINGS

These and other advantages and characteristics of the valve according to the present invention will be clear to those skilled in the art from the following detailed description of an embodiment thereof, with reference to the annexed drawings wherein.

DETAILED DESCRIPTION OF THE INVENTION

Figure 1:
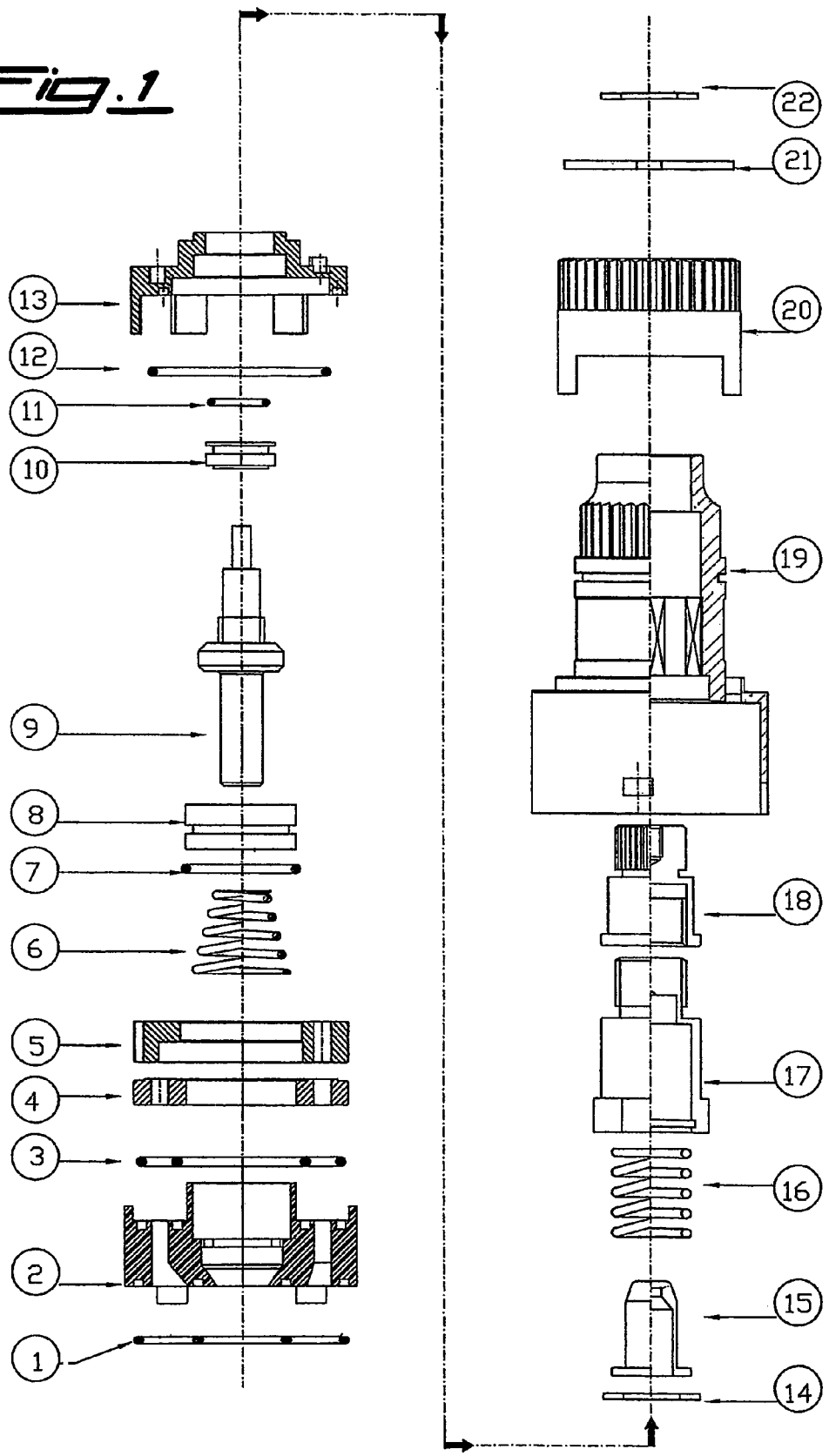
FIG. 1 is an exploded side view of the members which make up the above-mentioned valve, some of them being partially sectioned and others sectioned.
Figure 2:
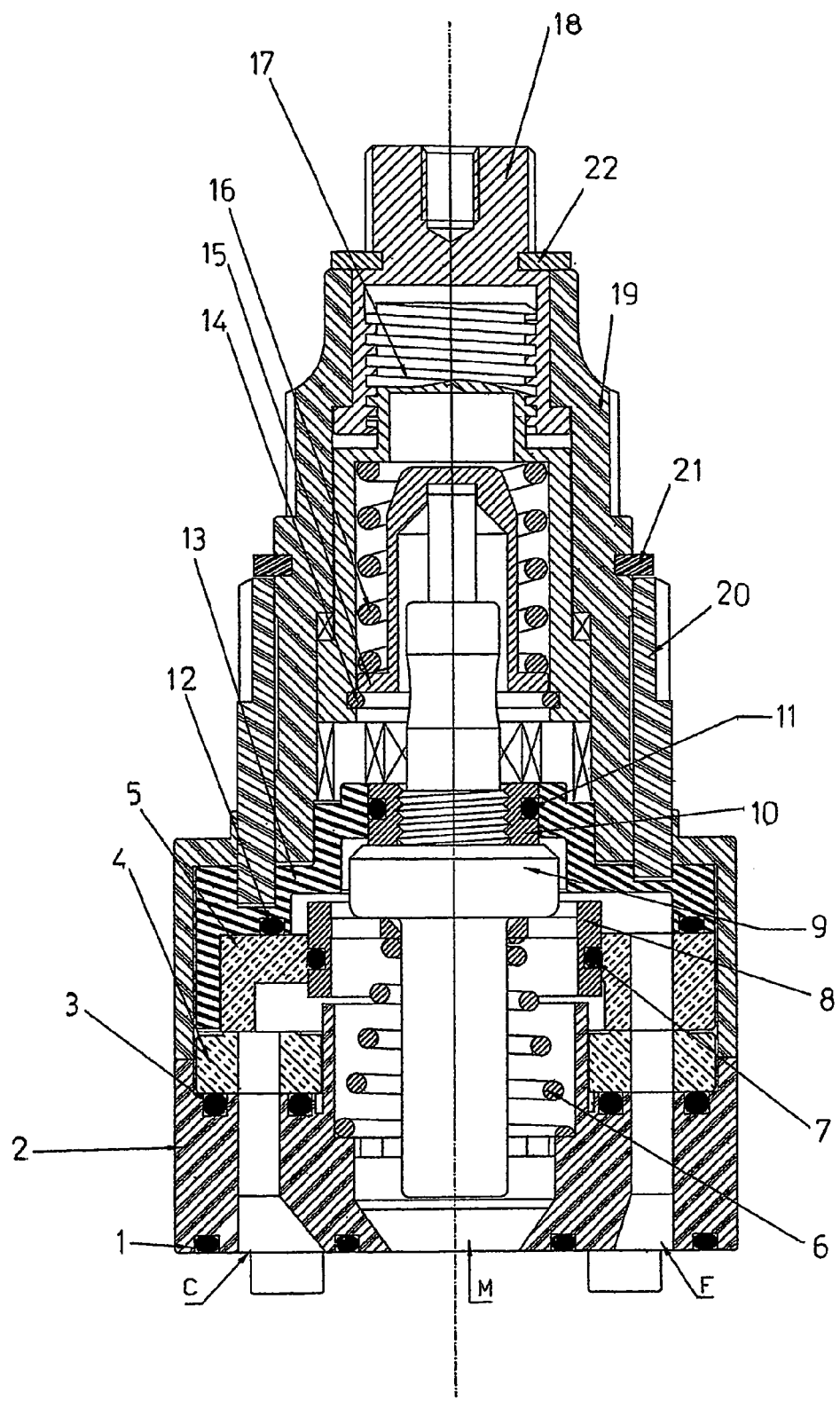
FIG. 2 is a schematic sectional side view showing the members of FIG. 1 in an assembled state.

With reference to FIGS. 1 and 2, there is seen that a valve according to the present invention includes a valve group, described in greater detail further on, consisting of a mobile upper disk 5, a fixed lower disk 4, a lower gasket 3 and a base 2, below which a relevant gasket 1 is arranged for the mounting into the tap body. In base 2 there are formed lateral openings C, F for the inflow of hot and cold water, respectively, and the central opening M for the outflow of the mixed water.

Inside the valve group there are arranged a lower spring 6 pushing from below a slider 8 that sealingly slides, thanks to an O-ring 7, in disk 5 and is pushed from above by a thermostatic member 9 passing through it. On the latter there is screwed an insert 10 that, thanks to an O-ring 11, is sealingly introduced in the central opening of a member 13 that transmits the flow rate control.

Also the top face of the upper disk 5 is sealed, thanks to an O-ring 12, against said member 13, so that the water is restrained below member 13. In this way the water pressure can not interfere with the operation of the temperature and flow rate controls located in the top portion of the valve.

The operation of the thermostatic device of the present valve is similar to that of conventional thermostatic valves and is based on the thermostatic member 9 which, according to the mixed water temperature detected by the bottom bulb, causes the shifting of slider 8 within the transmission member 13 and the upper disk 5. Due to the push of the upper rod against a cap 15 secured, by means of a retaining ring 14, inside an adjusting bar 17 and pushed downwards by a spring 16, the thermostatic member 9 shifts slider 8 so as to change the extent of aperture of the inflow ports of the hot and cold water. These ports are formed, respectively, between the lower edge of slider 8 and the upper edge of base 2, within the upper disk 5, and between the upper edge of slider 8 and the transmission member 13.

The position of the adjusting bar 17, and therefore the compression of the lower spring 6, is set by rotating, through a non-illustrated knob, a temperature control member 18 which is screwed on the top portion of bar 17.

The control member 18 projects from a housing body 19, which encloses the above-described elements and is coupled to base 2, and is axially locked on said body 19 by a retaining ring 22. Similarly, a flow rate control member 20 is inserted on the outside of body 19 and axially locked thereon by a retaining ring 21.

Member 20 externally engages the transmission member 13 by passing through suitable slots formed in body 19; on the latter there is also formed a grooved surface, above a similar grooved surface of member 20, to secure a fixed reference member for the setting of the temperature through member 18.

Figure 3:
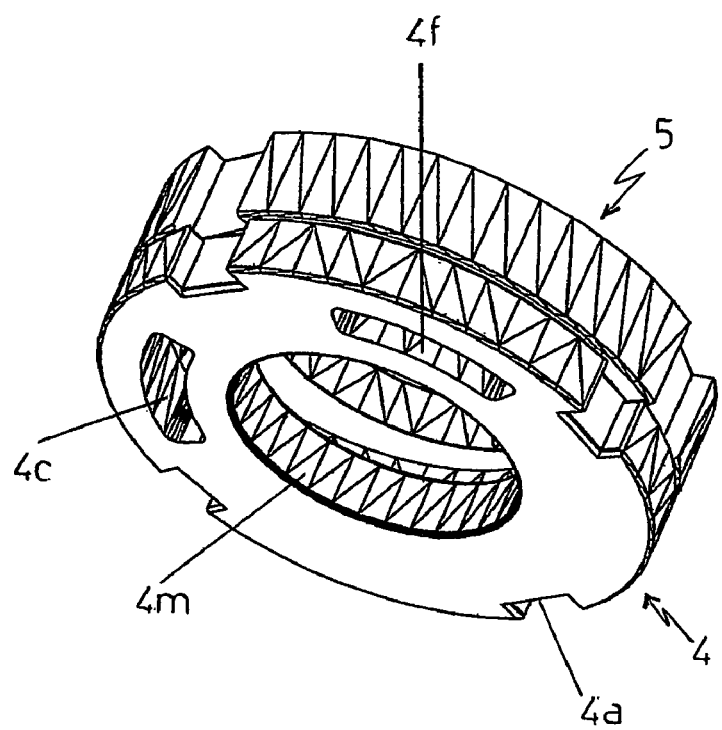
FIGS. 3 and 4 are perspective bottom views of the two ceramic disks making up the valve group and of the upper disk only, respectively.
Figure 4:
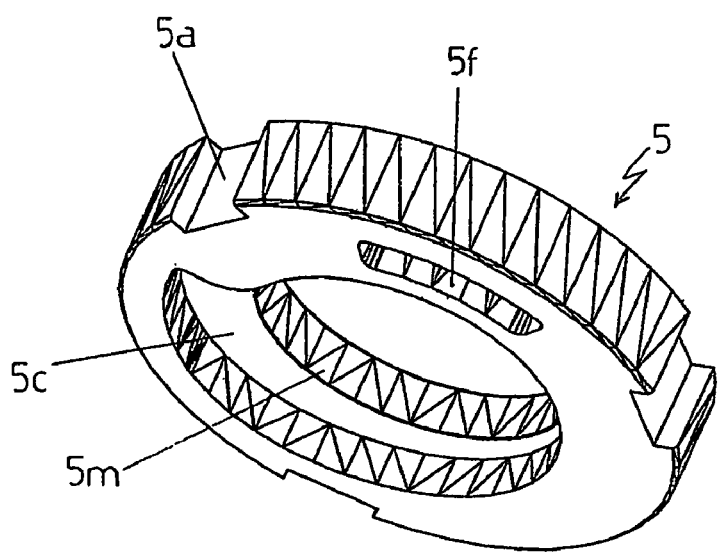

Referring now also to FIGS. 3 and 4, there is seen that the fixed lower disk 4 is conventionally provided with three water passage ports 4c, 4f and 4m for the hot, cold and mixed water, respectively, as well as with a plurality of lateral recesses 4a (four in the illustrated example) to be blocked in base 2.

Also the mobile upper disk 5 is provided with similar lateral recesses 5a (three in the illustrated example) to be driven into rotation by member 13 through corresponding stems, as well as with ports 5f, 5m for the passage of cold and mixed water respectively.

The novel aspect of disk 5 according to the present invention is given by the fact that in practice port 5m does not act as passage for the mixed water but as a seat for the sliding of slider 8, and by the fact that port 5c for the hot water extends substantially cam-shaped along about 180° and does not reach the top face of the disk.

In other words, port 5c is not a real port but a chamber formed in the bottom face, and it extends on the disk side opposite with respect to the side where port 5f is formed. The cam-shaped contour allows to perform the progressive closing of port 4c to adjust the flow rate of hot water, which does not pass through slider 8 but flows directly into base 2 mixing with the cold water coming from above.

It should be noted that the hot water chamber may also be formed partially or completely in the top face of the fixed disk 4, proportionally reducing the height of the mobile disk 5.

It is therefore possible to close the cold water completely, with the slider 8 abutting against member 13, and to have the hot water pass only through the two ceramic disks 4, 5 and base 2 without passing through slider 8.

It is also clear that the temperature (6, 14-18) and flow rate (13, 20) controls are absolutely independent, and the latter act directly on the mobile disk 5 without dragging other elements.

Moreover, the valve is shorter and is made up of only 22 pieces, of which three pieces are simple O-rings (7, 11, 12), two pieces are other gaskets (1, 3), three pieces are retaining rings (14, 21, 22) and other two pieces are simple springs (6, 16), while the thermostatic member 9 is commercially available. Therefore the pieces which have to be custom-made either in metal, plastic or ceramic are 11 only, with a consequent significant advantage in terms of manufacturing cost.

In order to reduce further the number of pieces it is even possible to form insert 10 integral with member 9, or the fixed disk 4 integral with base 2 dispensing with gasket 3. In this latter case, also the risks of leaks due to wear and/or wrong mounting of gasket 3 are prevented, however this solution implies manufacturing a base 2 of a ceramic material same as disk 5, so as to carry out the mobile sealing between members of the same material.

It is clear that the above-described and illustrated embodiment of the valve according to the invention is just an example susceptible of various modifications. For example, the exact shape and number of the members enclosed within housing 19 may be changed, in particular disks 4, 5 as well as base 2 as previously mentioned. Furthermore, all the members may be replaced by other mechanically equivalent members, such as recesses 4a and 5a which may be other types of rotational couplings.

The invention claimed is:

1. Thermostatic mixing valve provided with couplings for separate controls for adjusting a flow rate, through a valve group with overlapping ceramic disks which includes an upper disk and a lower disk, and temperature through a thermostatic device, the latter including a thermostatic member, a slider and a resilient means which are mobile within a mixing chamber for hot and cold water, wherein an access path of the hot water to the mixing chamber is completely formed within a bottom base and said ceramic disks, and said slider sealingly slides in a central seat of the upper disk.

2. Thermostatic mixing valve according to claim 1, wherein said access path of the hot water includes a substantially cam-shaped chamber formed in a bottom face of the upper disk, or in a top face of the lower disk or partly in the upper disk and partly in the lower disk.

3. Thermostatic mixing valve according to claim 2, wherein said substantially cam-shaped chamber extends along about 180° on a side opposite with respect to a side where a port for a passage of the cold water is formed.

4. Thermostatic mixing valve according to one of claims 1 to 3, wherein a coupling for temperature control is formed at a top of the valve, above a coupling surface for a fixed reference member formed on an outside of a housing body, above the coupling for flow rate control.

5. Thermostatic mixing valve according to claim 4, wherein the flow rate control is inserted on the outside of the housing body, axially locked thereon by a retaining ring, and externally engages a transmission member by passing through suitable slots formed in said housing body, said transmission member engaging in turn the upper disk.

6. Thermostatic mixing valve according to claim 5, wherein the thermostatic member is provided with an insert which is slidably introduced into a central opening of the transmission member.

7. Thermostatic mixing valve according to one of claims 1 to 3, wherein the lower disk is integral with the base.

* * * * *